(12) United States Patent
Yamamoto et al.

(10) Patent No.: US 11,383,664 B2
(45) Date of Patent: Jul. 12, 2022

(54) AIRBAG DEVICE

(71) Applicant: TOYOTA JIDOSHA KABUSHIKI KAISHA, Aichi-ken (JP)

(72) Inventors: Takeshi Yamamoto, Susono (JP); Yoshihiro Yamada, Susono (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/910,077

(22) Filed: Jun. 24, 2020

(65) Prior Publication Data

US 2021/0053524 A1 Feb. 25, 2021

(30) Foreign Application Priority Data

Aug. 21, 2019 (JP) .............................. JP2019-151484

(51) Int. Cl.
*B60R 21/203* (2006.01)
*B60R 21/233* (2006.01)
*B60R 21/2338* (2011.01)
*B60R 21/16* (2006.01)
*B60R 21/231* (2011.01)
(Continued)

(52) U.S. Cl.
CPC .......... *B60R 21/203* (2013.01); *B60R 21/233* (2013.01); *B60R 21/2338* (2013.01); *B60R 2021/0044* (2013.01); *B60R 2021/0048* (2013.01); *B60R 2021/01211* (2013.01); *B60R 2021/161* (2013.01); *B60R 2021/23107* (2013.01); *B60R 2021/23324* (2013.01); *B60R 2021/23382* (2013.01); *B60R 2021/23384* (2013.01); *B60R 2021/26094* (2013.01)

(58) Field of Classification Search
CPC . B60R 21/203; B60R 21/233; B60R 21/2338; B60R 2021/0044; B60R 2021/0048; B60R 2021/01211; B60R 2021/01231; B60R 2021/01238; B60R 2021/161; B60R 2021/23107; B60R 2021/23324; B60R 2021/23332; B60R 2021/23382; B60R 2021/23384; B60R 2021/26094
See application file for complete search history.

(56) References Cited

U.S. PATENT DOCUMENTS 5,560,648 A * 10/1996 Rhule ..................... B60R 21/16
280/731
6,419,262 B1 * 7/2002 Fendt .................... B60R 21/231
280/729

(Continued)

FOREIGN PATENT DOCUMENTS

| JP | 2005343267 A | 12/2005 | |
|---|---|---|---|
| JP | 200762469 A | 3/2007 | |
| JP | 2013126833 A * | 6/2013 | ........... B60R 21/215 |

*Primary Examiner* — Laura Freedman
(74) *Attorney, Agent, or Firm* — Hauptman Ham, LLP

(57) ABSTRACT

An airbag device of the disclosure includes an airbag module that is installed in a central region of a steering wheel of a vehicle, and that accommodates an airbag that can deploy behind the steering wheel when a driver is seated in the driver's seat. The airbag module has an airbag inflation control unit that controls an inflation direction of the airbag in such a manner as to allow the airbag to inflate above the airbag module, after the airbag has inflated in such a direction as to abut on the driver's chest at the time of deployment of the airbag.

7 Claims, 6 Drawing Sheets

(51) Int. Cl.
    *B60R 21/01*    (2006.01)
    *B60R 21/26*    (2011.01)
    *B60R 21/00*    (2006.01)

(56) References Cited

U.S. PATENT DOCUMENTS

| | | | | |
|---|---|---|---|---|
| 6,786,505 | B2 * | 9/2004 | Yoshida | B60R 21/233 |
| | | | | 280/729 |
| 6,971,666 | B2 * | 12/2005 | Akiyama | B62J 27/20 |
| | | | | 280/729 |
| 7,441,799 | B2 * | 10/2008 | Enders | B60R 21/203 |
| | | | | 280/731 |
| 7,510,212 | B2 * | 3/2009 | Green | B60R 21/2338 |
| | | | | 280/738 |
| 7,631,891 | B2 * | 12/2009 | Washino | B60R 21/203 |
| | | | | 280/731 |
| 8,308,191 | B2 * | 11/2012 | Hiruta | B60R 21/239 |
| | | | | 280/736 |
| 8,414,019 | B2 * | 4/2013 | Naganawa | B60R 21/203 |
| | | | | 280/730.1 |
| 8,596,680 | B2 * | 12/2013 | Kim | B60R 21/2338 |
| | | | | 280/743.2 |
| 8,690,185 | B2 * | 4/2014 | Yamaji | B60R 21/233 |
| | | | | 280/729 |
| 2002/0084634 | A1 * | 7/2002 | Adomeit | B60R 21/203 |
| | | | | 280/731 |
| 2006/0163848 | A1 * | 7/2006 | Abe | B60R 21/231 |
| | | | | 280/729 |
| 2007/0046002 | A1 | 3/2007 | Bito | |
| 2011/0210533 | A1 * | 9/2011 | Adachi | B60R 21/217 |
| | | | | 280/728.2 |
| 2017/0355341 | A1 * | 12/2017 | Keyser | B60R 21/203 |
| 2018/0290616 | A1 * | 10/2018 | Nakajima | B60R 21/203 |
| 2020/0307486 | A1 * | 10/2020 | Ishii | B60R 21/237 |
| 2021/0300290 | A1 * | 9/2021 | Ishii | B60R 21/203 |

* cited by examiner

FROM IGNITION CONTROL DEVICE

BEFORE IGNITION

CUTTING  EXTENSION

AFTER IGNITION

AIRBAG DEVICE

INCORPORATION BY REFERENCE

The disclosure of Japanese Patent Application No. 2019-151484 filed on Aug. 21, 2019 including the specification, drawings and abstract is incorporated herein by reference in its entirety.

BACKGROUND

1. Technical Field

The disclosure relates to an airbag device that is installed in a vehicle such as an automobile or the like, and more specifically, to an airbag device for a driver's seat.

2. Description of Related Art

In an airbag device for a driver's seat of a vehicle, an airbag is typically accommodated in a folded state in a central region of a steering wheel. When the vehicle receives an impact exceeding a certain level, the gas from an inflator is injected into the airbag, and the airbag is deployed between a driver and the steering wheel. Various aspects on the deployment of the airbag have been proposed to make it possible to appropriately soften the impact on the driver in deploying this airbag. For example, in Japanese Patent Application Publication No. 2005-343267 (JP 2005-343267 A), there is proposed a configuration in which the timings for deploying respective parts of the airbag in such a manner as to guarantee the performance of restraining an occupant by inflating both lateral portions of the airbag corresponding to a lateral direction of the occupant before inflating a central region of the airbag moving toward an area in front of the occupant, with a view to preventing the occupant from popping out forward from beside the airbag, when the airbag deploys in response to an impact on a vehicle. Besides, in Japanese Patent Application Publication No. 2007-062469 (JP 2007-062469 A), there is proposed a configuration of a variant steering wheel having a non-annular rim portion that substantially assumes the shape of H in a plan view with a pair of right and left inferior arcuate grip portions and a coupling portion that couples both the grip portions to each other. In this variant steering wheel, with a view to ensuring a reactive force of an airbag backward with respect to the vehicle (toward a driver's seat side) at an upper portion of the steering wheel where there is no rim portion when the airbag is deployed, an additional airbag or a different type of projection member is deployed at the upper portion of the steering wheel in addition to a main airbag that deploys between the steering wheel and the driver, to apply the reactive force backward with respect to the vehicle in such a manner as to resist a pressing force applied to the main airbag by the driver.

SUMMARY

In an airbag device for a vehicle with an airbag that deploys in front of a driver's seat as described above (which is referred to also as "a frontal airbag for a driver's seat"), with a view to softening an impact on the driver's trunk by avoiding direct contact between the driver's trunk and a steering wheel, an airbag module (hereinafter referred to as "the module") that accommodates the folded airbag is installed in such a manner as to cover a tip of a steering shaft in a central region of the steering wheel such that the inflated airbag is interposed between the steering wheel and the driver's trunk at the time of deployment of the airbag. As for the configuration of this airbag device for the driver's seat, it has been found out that when the airbag deploys with the driver's trunk close to or in contact with the steering wheel, an upper part of the airbag enters a space below the driver's chin, and that the airbag can hence become unlikely to deploy in front of the driver's head.

The situation as described above arises because the driver's chest is too close to the module and a lower part of the driver's head is located above the module before deployment of the airbag if the driver's trunk is inclined forward when the upper part of the airbag inflates. Thus, as a method of allowing the airbag to appropriately deploy in front of the driver's head, it is conceivable to control the timing for deploying the airbag such that a part of the airbag that is to abut on the driver's chest is first inflated, that the driver's trunk is thereby spaced apart backward from the module, and that the upper part of the airbag is thereafter inflated, so as to ensure a space in which the upper part of the airbag is allowed to inflate above the module before the upper part of the airbag inflates.

Thus, one main task of the disclosure is to provide a frontal airbag device for a driver's seat of a vehicle that is configured such that an upper part of an airbag can more reliably deploy in front of the driver's head even when the driver's trunk is inclined forward at the time of the start of deployment of the airbag.

Another task of the disclosure is to provide a frontal airbag device for a driver's seat of a vehicle as described above that controls the timing for deploying an airbag such that a part of the airbag that is to abut on the driver's chest first inflates at the time of the start of deployment of the airbag, and that the driver's trunk is spaced apart further backward and an upper part of the airbag is thereafter allowed to inflate when the driver's trunk is close to a module.

According to the disclosure, one of the above-mentioned tasks is achieved by an airbag device for a driver's seat of a vehicle. The airbag device includes an airbag module that is installed in a central region of a steering wheel of the vehicle, and that accommodates an airbag that can deploy by inflating behind the steering wheel when the driver is seated in the driver's seat of the vehicle. The airbag module has an airbag inflation control unit that controls an inflation direction of the airbag in such a manner as to allow the airbag to inflate above the airbag module, after the airbag has inflated in such a direction as to abut on the driver's chest at a time of deployment of the airbag.

The above-mentioned device is a frontal airbag device for a driver's seat of a vehicle that allows an airbag to deploy between the driver sitting in the driver's seat and a steering wheel. "The airbag module" is a module that includes a folded airbag and that is configured to be able to inflate and deploy the airbag by delivering gas into the airbag in deploying the airbag. In normal circumstances, the airbag module may be accommodated in a central region of the steering wheel, namely, a region that covers a tip of a steering shaft and from which a spoke radially extends to support a circular or rod-like rim. The airbag module is typically equipped with an inflator that generates the gas delivered into the airbag. When the vehicle receives, in a longitudinal direction thereof, an impact exceeding a predetermined level that is appropriately set by a designer, for example, when a G sensor detects an acceleration equal to or larger than a predetermined value that is appropriately set by the designer, the inflator starts delivering gas into the airbag. Thus, the airbag inflates and eventually deploys in such a manner as to cover an area in front of (before) the driver's trunk ranging from his or her chest to his or her head, behind the steering wheel. As a result, the impact on the driver's trunk is expected to be softened.

In the airbag device as described above, as mentioned already, when the deployment of the airbag is started and the airbag inflates above the module with the driver's trunk close to or abutting on the steering wheel equipped with the airbag module and with the driver's head present in a space above the module, an upper portion of the airbag enters the space below the driver's chin, and the airbag becomes unlikely to deploy in front of the driver's head. Thus, as described above, the device of the disclosure is provided with the airbag inflation control unit that controls the inflation direction of the airbag such that the airbag first inflates in such a direction as to abut on the driver's chest and thereafter is inflated above the module, in deploying the airbag. According to this configuration, even when the driver's trunk is close to the module due to previous inflation of the airbag in such a direction as to abut on the driver's chest, the driver's trunk is displaced backward with respect to the vehicle. Thus, the driver's head retreats, and the space above the module is more reliably opened. Then, the airbag inflates above the module with the space above the module vacant, and is expected to be more reliably deployed in front of the driver's head.

Incidentally, a state where the driver's head enters the space above the module as described above is likely to arise especially in the case where the steering wheel is a so-called variant steering wheel, for example, in the case where the steering wheel assumes a shape having an area above a space module that can be entered by the driver's head, for example, such a shape that a part of an upper region (1R) of a normal annular wheel is not provided with an arcuate rim, such a shape that a rim that couples both lateral parts of the wheel to each other above is not arcuate and extends substantially horizontally, etc. In fact, according to an experiment conducted by the inventors and the like of the disclosure to deploy an airbag for a vehicle through the use of a dummy doll, it is found out that when the airbag is deployed in an out-of-position (OOP) state (where the dummy doll is inclined forward, the chest of the dummy doll abuts on the central region of the steering wheel, and the chin of the dummy doll extends above the central region of the steering wheel) in the case where the steering wheel is a variant steering wheel, an index value representing the degree of an impact received by the dummy doll that is calculated from a force and a torque measured by a force/torque sensor installed at a lower portion of the head of the dummy doll becomes relatively large. Accordingly, the steering wheel in the above-mentioned device of the disclosure may be such a variant steering wheel, but is not limited thereto.

In the above-mentioned device, more specifically, the airbag module may be provided with a gas outflow unit that causes gas for inflating the airbag to flow out into the airbag at the time of deployment of the airbag, and a gas flow control unit that controls flow of gas in such a manner as to allow gas to flow from the gas outflow unit into the airbag in an upward direction with respect to the airbag module in such a direction as to abut on the driver's chest after inflation of the airbag. The gas outflow unit may be an inflator unit of any type (a gas generation agent type, a pressure accumulation type, a hybrid type, or the like) that is adopted in this field to deliver gas into the airbag in deploying the airbag. Moreover, the part of the airbag that is to abut on the driver's chest first inflates, and then the gas is allowed to flow in upward with respect to the module due to the gas flow control unit. Therefore, even when the drivers trunk is close to the module, the airbag can inflate above the module and deploy in front of the drivers head after the drivers trunk is displaced from the module backward with respect to the vehicle and the space above the module is vacated.

As described above, in order to achieve an aspect in which the part of the airbag that is to abut on the driver's chest inflates and then the part of the airbag that deploys above the module inflates in the airbag, the device of the disclosure may be configured such that the airbag inflates in such a direction as to abut on the drivers chest after the start of deployment of the airbag, and that the airbag starts inflating above the airbag module after the lapse of a predetermined time. The above-mentioned "predetermined time" can be set to an appropriate length of time through an experiment or the like. Besides, the aspect of deployment of the airbag is controlled as described above with a view to preventing the deployment of the airbag above the module from being blocked by the lower part of the driver's head or the driver's neck, and retreating the driver's trunk from the steering wheel or the module by a distance that allows the space above the module to be ensured. Accordingly, the device of the disclosure may be configured such that the inflation of the airbag above the airbag module is started after the airbag inflates from the steering wheel backward with respect to the vehicle by a predetermined distance in such a direction as to abut on the driver's chest after the start of deployment of the airbag. This "predetermined distance" can be set to an appropriate value through an experiment or the like. The timing for starting inflation of the airbag above the module (a waiting time width from the time when the deployment of the airbag is started) may be appropriately determined through an experiment or the like, such that the inflation of the airbag above the module is started after the inflation of the airbag by "the predetermined distance" in such a direction as to abut on the driver's chest is achieved.

In the embodiment, a small airbag of which a part that is to abut on the driver's chest inflates may be provided inside the airbag, as the gas flow control unit. In concrete terms, this small airbag may have a smaller dimension than the airbag, and may be formed substantially in the same size as the driver's chest in an inflated state. Moreover, the device may be configured such that the inflation of the airbag above the airbag module is permitted after the small airbag first inflates, at the time of deployment of the airbag. According to this configuration, even when the driver is close to the steering wheel at the time of deployment of the airbag, the driver's chest is pushed backward with respect to the vehicle and spaced apart from the steering wheel due to inflation of the small airbag, and the inflation of the airbag above the module is started with the space above the airbag module vacant. Thus, the airbag can more reliably deploy in front of the driver's head.

In the configuration in which the small airbag as described above is adopted, more specifically, the small airbag may have an upper gas flow outlet that causes the gas received from the gas outflow unit to flow out into an upper part in the airbag that deploys into a space above the airbag module, and a lower-rear gas flow outlet that causes the gas received from the gas outflow unit to flow out into a space below and behind the airbag module in the airbag. Furthermore, the gas flow control unit may have a gas flow outlet opening/closing unit that controls the opening/closing of the upper gas flow outlet or the upper gas flow outlet and the lower-rear gas flow outlet. Moreover, the upper gas flow outlet may be held closed by the gas flow outlet opening/closing unit, and the upper gas flow outlet may be opened upon the lapse of a predetermined time after the start of deployment of the airbag, by the gas flow outlet opening/closing unit. Incidentally, the lower-rear gas flow outlet may be opened at the time of the start of deployment of the airbag. It should be noted herein that "the predetermined time" to the opening of the upper gas flow outlet after the start of deployment of the airbag may be set experimentally. In concrete terms, as described above, "the predetermined time" may be set to a time to inflation of the part of the airbag that is to abut on the driver's chest, such that the driver's chest is spaced apart from the steering wheel backward with respect to the vehicle and the space above the airbag module becomes vacant due to inflation of the small airbag, even when the driver is close to the steering wheel at the time of deployment of the airbag. According to this configuration, even when the driver is close to the steering wheel at the time of deployment of the airbag, the space above the airbag module can be more reliably vacated by inflating the airbag more in a space below and behind the module before the opening of the upper gas flow outlet. Still further, the small airbag may have a rear gas flow outlet that causes the gas to flow out into a space in the airbag behind the airbag module (a space located behind with respect to the vehicle as viewed from the module), the gas flow outlet opening/closing unit may control the opening/closing of the rear gas flow outlet, the rear gas flow outlet may be held closed at the time of start of deployment of the airbag, by the gas flow outlet opening/closing unit, and the rear gas flow outlet may be opened upon the lapse of the predetermined time after the start of deployment of the airbag, by the gas flow outlet opening/closing unit. According to this configuration, the airbag is expected to be swiftly deployed in the space above the module in front of the driver's head, after the space above the airbag module is vacated.

The gas flow outlet opening/closing unit in the above-mentioned small airbag may be achieved in any aspect. As one aspect, the gas flow outlet opening/closing unit may have a tether that keeps the gas from flowing by contracting a corresponding one of the gas flow outlets when being wound, pulled, and tensed in a vicinity of that one of the gas flow outlets through which the gas is kept from flowing at the time of start of deployment of the airbag (the upper gas flow outlet or the upper gas flow outlet and the rear gas flow outlet), and a tether cutter that cuts the tether. The tether cutter may cut the tether upon the lapse of the predetermined time after the start of deployment of the airbag. The gas flow outlet may be configured to be opened when the tether is cut and loosened. It should be noted herein that when gas is kept from flowing, the flow of gas may be substantially shut off. However, the flow of gas may be permitted to such an extent that any significant amount of inflation of the airbag above the module is suppressed. Such a case also falls within the scope of the disclosure.

Thus, in the above-mentioned device of the disclosure, in deploying the airbag, the entire airbag does not uniformly inflate. Instead, the mode of deployment of the airbag is controlled such that the part of the airbag that abuts on the driver's chest first inflates and that the airbag thereafter inflates into the space above the module. According to this configuration, even when the driver's trunk is inclined forward and the driver's head exists in the space above the module at the time of the start of deployment of the airbag, the driver's chest is first displaced from the module backward with respect to the vehicle due to partial inflation of the airbag, the driver's trunk is thereby retreated, the space above the module is opened, and the airbag thereafter deploys into the space above the module. Then, the upper portion of the airbag is kept from entering the space below the driver's chin, and the airbag is expected to be more reliably deployed in front of the driver's head.

Other objects and advantages of the disclosure will become apparent from the description of the following preferred embodiments of the disclosure.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1A:
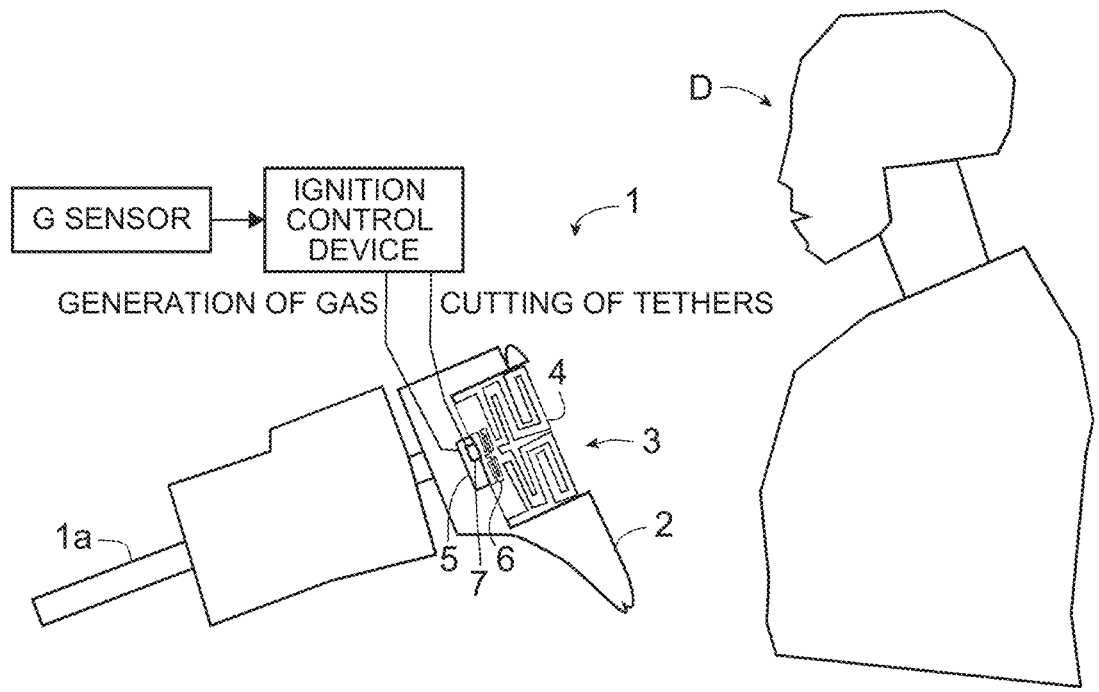
FIG. 1A is a schematic view of the configuration of an airbag device for a driver's seat of a vehicle according to one of the embodiments.

Some preferred embodiments of the disclosure will be described hereinafter in detail with reference to the accompanying drawings. In the drawings, like components or portions are denoted by like reference symbols.

Configuration of Device

Referring to FIG. 1A, as is the case with a normal frontal airbag device for a driver's seat, an airbag device 1 according to one of the embodiments is equipped with an airbag module 3 accommodating an airbag, in a substantially central region of a steering wheel 2 of a steering device of a vehicle, namely, in the vicinity of a tip of a steering shaft 1a, in such a manner as to cover the tip of the steering shaft 1a. An (main) airbag 4 that may be of a normal type and that can deploy by inflating in front of the driver's trunk ranging from his or her abdomen to his or her head is accommodated in a folded state in the airbag module 3. An inflator 5 that generates gas for inflating the airbag 4 is installed on a bottom surface (a surface extending leftward and backward in the drawing) of the airbag module 3. The inflator 5 may inject the gas delivered into the airbag 4 in response to a control command (to generate gas) from an ignition control device, according to any method such as a gas generation agent method, a pressure accumulation method, a hybrid method, or the like. The ignition control device is configured to issue a control command to generate gas to the inflator 5, upon receiving an output of a G sensor that detects a longitudinal G of the vehicle and detecting from the output of the G sensor that the vehicle has received a longitudinal acceleration exceeding a predetermined value. Furthermore, as will be described later, the airbag device according to the present embodiment is provided with a small airbag 6 having a smaller dimension, inside the airbag 4, as an airbag inflation control unit that controls the inflation direction of the airbag. The gas from the inflator 5 may be first delivered to the small airbag 6, and may thereafter flow out from gas flow outlets provided through the small airbag 6 into the airbag 4. In particular, the upper and rear gas flow outlets provided through an upper portion or an upper portion and lateral portions of the small airbag 6 are substantially closed through the use of a tether before deployment of the airbag and at an initial stage of deployment of the airbag, as will be described later. The upper and rear gas flow outlets may be opened through the cutting of the tether by a tether cutter 7 in response to a control command (to cut the tether) that is issued upon the lapse of a predetermined time after the control command (to generate gas) from the ignition control device.

Figure 1B:
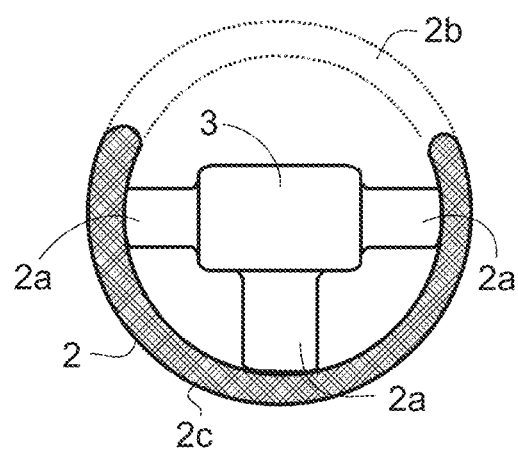
FIG. 1B is a schematic front view of a variant steering wheel to which the airbag device according to the present embodiment is applied.

Incidentally, as described in the section of "summary", the airbag device according to the present embodiment is configured such that an upper part of the airbag can reliably deploy in front of the drivers head even when the driver's trunk is inclined forward. In particular, in the case where the steering wheel 2 is a variant steering wheel, namely, in the case where there is no upper part 2b (referred to as 1R) of an annular structure indicated by a dotted line or even if there is, the upper part 2b has been displaced downward and is shaped in such a manner as to have a rim 2c only in a region extending downward from both sides of the airbag module 3 as schematically depicted in FIG. 1B, the driver's head inclined forward is likely to enter a space above the airbag module 3. In such a configuration, the advantages of the present embodiment in an aspect that will be described later are more effectively used. Thus, the steering wheel 2 to which the airbag device according to the present embodiment is applied may be a variant steering wheel.

Configuration and Operation of Airbag Inflation Control Unit

In the above-mentioned airbag device according to the present embodiment, as described in the section of "summary" as well, the airbag 4 first inflates in such a direction as to abut on the drivers chest, and after that, the direction in which the airbag 4 inflates is controlled such that the airbag 4 is inflated above the module 3. In the present embodiment, as a control unit that controls the inflation direction of this airbag 4, there is adopted a configuration (a gas flow control unit) in which the gas from the inflator 5 is delivered to another bag-shaped small airbag 6 fitted inside the bag-shaped airbag 4 to inflate the small airbag 6, and the flow of gas from the small airbag 6 into the airbag 4 is thereafter controlled with the passage of time, especially as described above.

Figure 2:
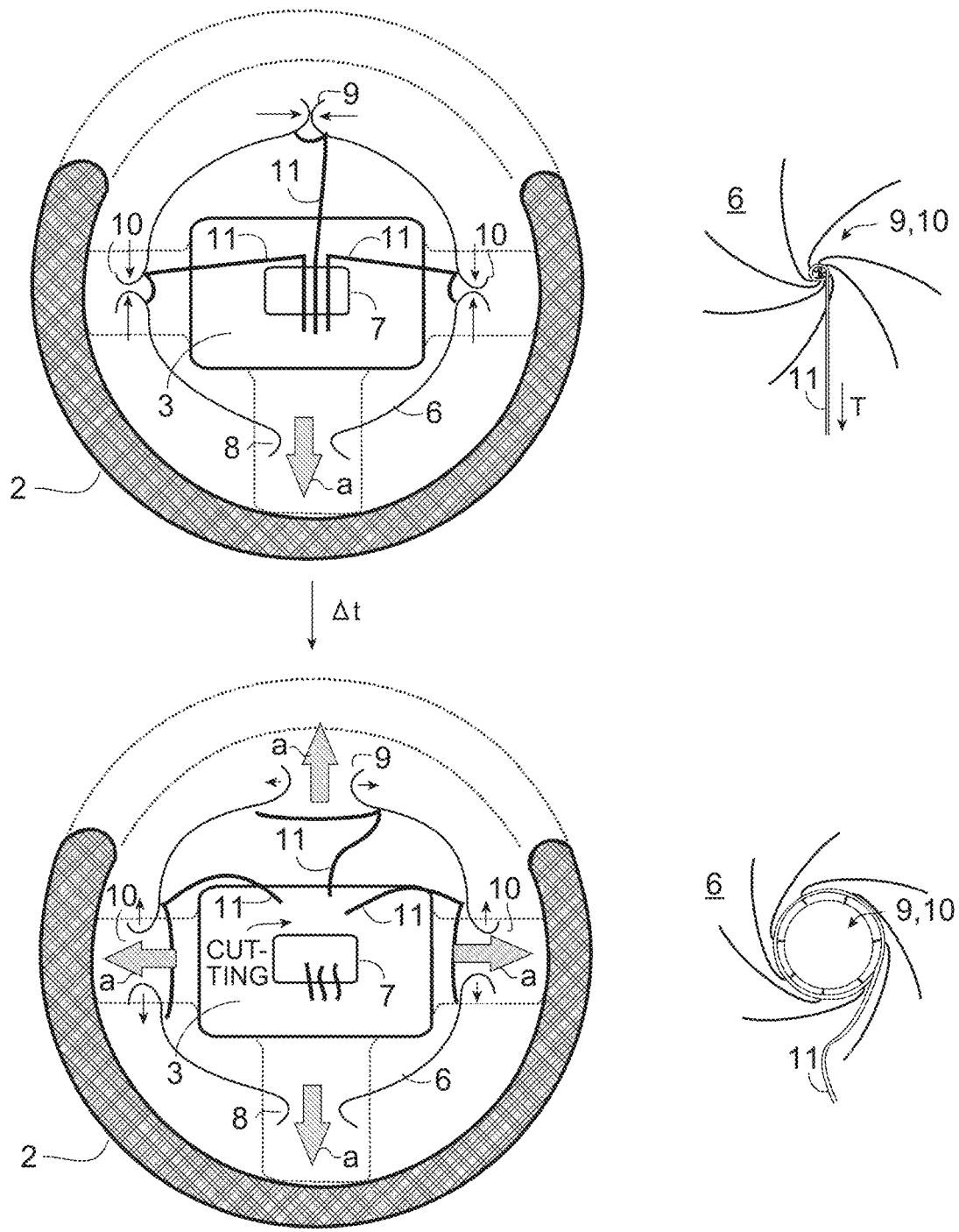
FIG. 2 includes four figures, an upper left figure in FIG. 2 is a schematic front view of the variant steering wheel for illustrating the flow of gas immediately after the start of deployment of an airbag in the airbag device according to the present embodiment, an upper right figure in FIG. 2 is a schematic view of (upper and rear) gas flow outlets that are provided through a small airbag and that are in a closed state immediately after the start of deployment of the airbag, a lower left figure in FIG. 2 is a schematic front view of the variant steering wheel for illustrating the flow of gas after the lapse of a predetermined time since the start of deployment of the airbag in the airbag device according to the present embodiment, and a lower right figure in FIG. 2 is a schematic view of the (upper and rear) gas flow outlets that are provided through the small airbag and that assume an open state after the lapse of the predetermined time since the start of deployment of the airbag.

More specifically, as depicted in FIG. 2, the small airbag 6 is provided with a lower-rear gas flow outlet 8 for discharging the gas inside the small airbag 6 downward (downward and backward as viewed from the module 3), an upper gas flow outlet 9 for discharging the gas inside the small airbag 6 upward, and rear gas flow outlets 10 for discharging the gas inside the small airbag 6 sideways (backward as viewed from the module 3). In particular, as shown in an upper left figure of FIG. 2, the upper gas flow outlet 9 and the rear gas flow outlets 10 are substantially closed to shut off the flow of gas, before deployment of the airbag and at the initial stage of deployment of the airbag. In closing the gas flow outlets 9 and 10, tethers 11 may be wound along a circumferential direction of the gas flow outlets 9 and 10, these tethers 11 may be pulled (T) to narrow the peripheries of the gas flow outlets 9 and 10, and opening parts (peripheral edges of the flow outlets) may be contracted to such an extent that the flow of a substantial amount of gas therethrough is shut off, as shown in, for example, an upper right figure of FIG. 2. Besides, ends of the tethers 11 on the other side of the gas flow outlets 9 and 10 may remain pulled via the tether cutter 7 or the like. Moreover, in opening the gas flow outlets 9 and 10, the tethers 11 may be loosened to loosen the peripheries of the gas flow outlets 9 and 10 through the cutting or the like of the tethers 11 by the tether cutter 7 as shown in a lower left figure of FIG. 2, and the opening parts may be enlarged to such an extent that the flow of a substantial amount of gas therethrough is permitted as shown in a lower right figure of FIG. 2.

Figure 3A:
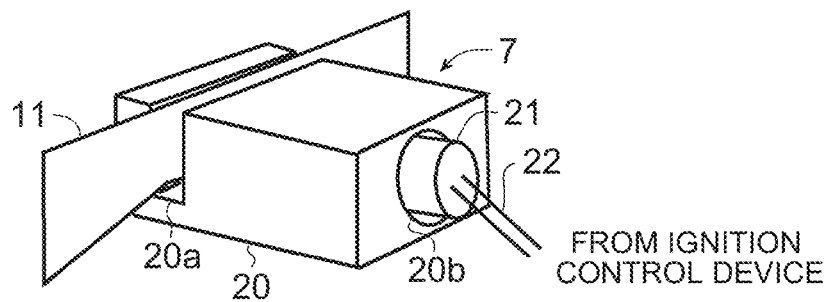
FIG. 3A is a schematic perspective view of a tether cutter for cutting a tether that closes the (upper and rear) gas flow outlets that are provided through the small airbag.
Figure 3B:
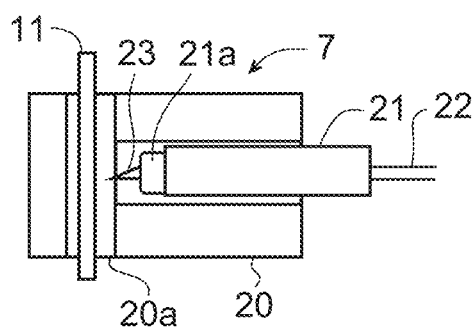
FIG. 3B is a schematic top view of the tether cutter before cutting the tether that closes the (upper and rear) gas flow outlets.
Figure 3C:
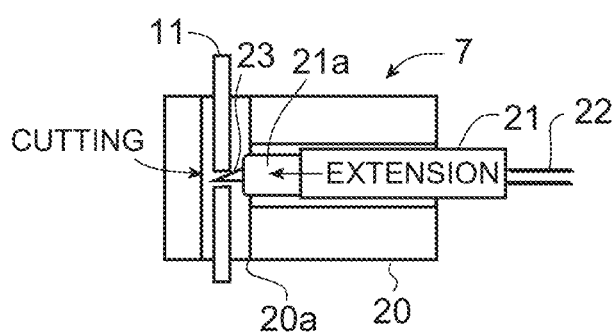
FIG. 3C is a schematic top view of the tether cutter after cutting the tether that closes the (upper and rear) gas flow outlets.

As shown in FIG. 2, the configuration in which the tethers 11 are first tensed to contract and close the gas flow outlets 9 and 10 and the tethers 11 are loosened to open the gas flow outlets 9 and 10 may be realized through the use of any mechanism capable of appropriately controlling the tension and loosening of the tethers 11. In one of the embodiments, as mentioned already, the tethers 11 wound around the gas flow outlets 9 and 10 may be held via the tether cutter 7 and tensed, and the tether cutter 7 may thereafter cut the tethers 11 to loosen the tethers 11 at a certain timing. For example, the tether cutter 7 may be configured to include a housing 20 having a groove 20a through which the tethers 11 are passed, and a hole 20b that receives a piston 21a in a cylinder 21 provided with a blade 23 at a tip thereof, as schematically depicted in FIG. 3A. In this case, before deployment of the airbag and at the initial stage of deployment of the airbag, the piston 21a in the cylinder 21 is contracted, the blade 23 is held at a position set back from the groove 20a, and the tethers 11 are held in a tensed state after having been passed through the groove 20a, as shown in FIG. 3B. Moreover, gunpowder or the like is put inside the piston 21a in the cylinder 21. When a control command from the ignition control device is given to the cylinder 21 through a signal wire 22, the gunpowder in the piston 21a in the cylinder 21 may ignite, the piston 21a may thereby extend, the blade 23 at the tip of the piston 21a may enter the interior of the groove 20a, the tethers 11 in the groove 20a may be cut, and the tethers 11 may thereby be loosened.

Incidentally, the lower-rear gas flow outlet 8 of the aforementioned small airbag 6 may be opened such that gas can flow therethrough, from before deployment of the airbag. In this case, after the start of discharge of gas by the inflator 5, the small airbag 6 may be inflated, and gas flows into a lower part of the airbag 4 as well to inflate the lower part of the airbag 4 as well. Thus, the driver's trunk can be more reliably displaced backward. Alternatively, according to another aspect, the lower-rear gas flow outlet 8 may also be provided with a mechanism that contracts and closes the opening parts as described above, and may be appropriately opened after inflation of the small airbag 6.

The above-mentioned small airbag 6 may be typically formed in a vertical size corresponding to the vertical size of the driver's chest in an inflated state, and in such a size that the driver's chest can be spaced apart from the airbag module 3 to such an extent that the driver's head is reliably released backward from the space above the airbag module 3 in a backward direction with respect to the vehicle. In operation, when the discharge of gas by the inflator 5 is started, the gas inflates the small airbag 6 as shown in the upper left figure of FIG. 2. Besides, when the lower-rear gas flow outlet 8 is open, a gas a flows into the lower part of the airbag 4 and inflates this part. After that, when the small airbag 6 pushes the driver's chest backward and inflates by a predetermined distance such that the driver's chest is spaced apart from the airbag module 3 to such an extent that the driver's head is reliably released backward from the space above the airbag module 3 after the lapse of a predetermined time Δt, the gas flow outlets 9 and 10 are also opened (through the operation of the tether cutter 7 or the like) as shown in the upper right figure of FIG. 2. Thus, the gas a flows into the rear and upper parts of the airbag 4 as well, and starts inflating these parts as well.

Figure 4A:
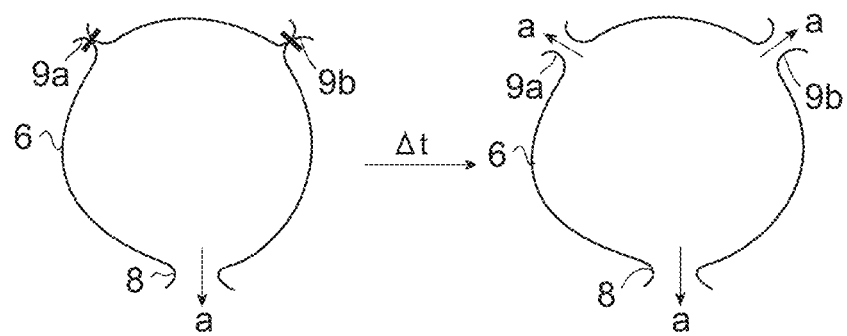
FIG. 4A is a schematic plan view of another embodiment of the small airbag.
Figure 4B:
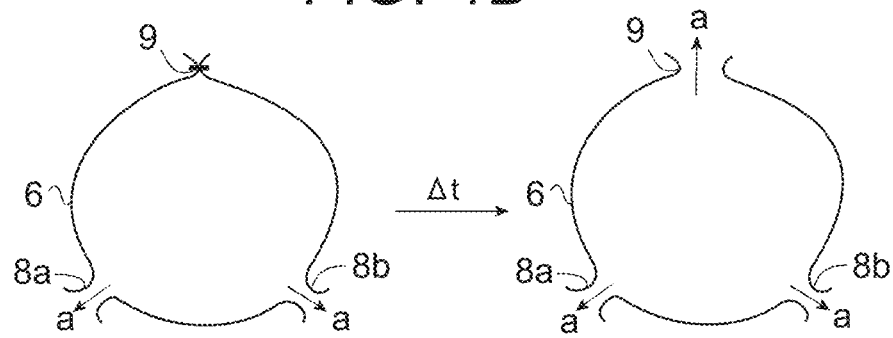
FIG. 4B is a schematic plan view of still another embodiment of the small airbag.

The small airbag 6 may have any configuration that allows the upper part of the airbag to start inflating after inflation of the small airbag 6 itself or the small airbag 6 itself and the lower part of the airbag 4. For example, there may be adopted a configuration in which a plurality of gas discharge ports 9a and 9b are provided through an upper area of the small airbag 6, and a single gas discharge port 8 is provided through a lower area of the small airbag 6 as shown in FIG. 4A, or a configuration in which a single gas discharge port 9 is provided through the upper area of the small airbag 6, and a plurality of gas discharge ports 8 are provided through the lower area of the small airbag 6 as shown in FIG. 4B. The gas discharge ports or the gas discharge port in the upper area may be first held closed, and may be opened after the lapse of the predetermined time Δt to allow gas to be discharged.

Operation of Device

Referring to FIGS. 5 to 7B, in operation of the present embodiment, when the ignition control device detects, with reference to an output of the G sensor, that a longitudinal acceleration exceeding a predetermined value is applied to the vehicle, the operation of the airbag device is started. At this timing, when the driver is inclined forward with his or her chest close to the steering wheel 2 to the extent of abutting thereon (in the OOP state) like a dummy doll D of FIG. 6A, the driver's head is likely to enter the space above the airbag module 3 (the driver's chin can be located directly above the airbag module 3 especially in the case of a variant steering wheel as described above). In this state, when even the upper part of the airbag is inflated, the airbag enters a space below the driver's chin, and becomes unlikely to deploy in front of the driver's head (the driver's face). Thus, in the present embodiment, as mentioned already, the small airbag 6 or the small airbag 6 and the lower part of the airbag 4 are inflated without inflating the upper part of the airbag 4 immediately after the start of deployment of the airbag. Then, after the lapse of a predetermined time, in concrete terms, even when the driver's trunk is close to the airbag module 3 as shown in FIG. 6A, the driver's trunk is spaced apart from the airbag module 3 by the inflated small airbag 6 or the inflated small airbag 6 and the inflated lower part of the airbag 4, and the inflation of the upper part of the airbag is started after the driver's head is almost released from the space above the airbag module 3.

Figure 5:
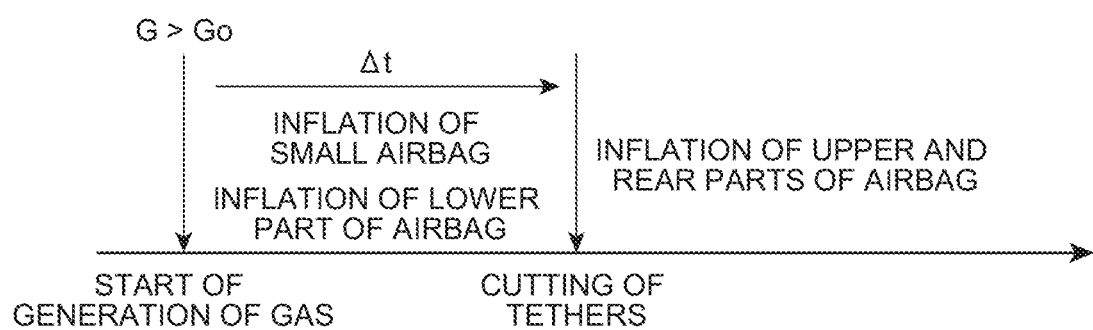
FIG. 5 is a time chart of deployment of the airbag.
Figure 6A:
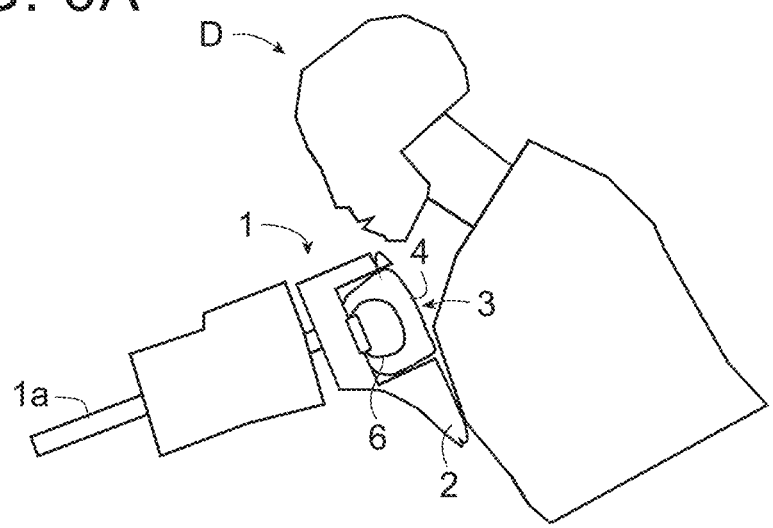
FIG. 6A is a schematic lateral view of the airbag device according to the present embodiment applied to the variant steering wheel in a state before deployment of the airbag, with a dummy doll arranged in an OOP state.
Figure 6B:
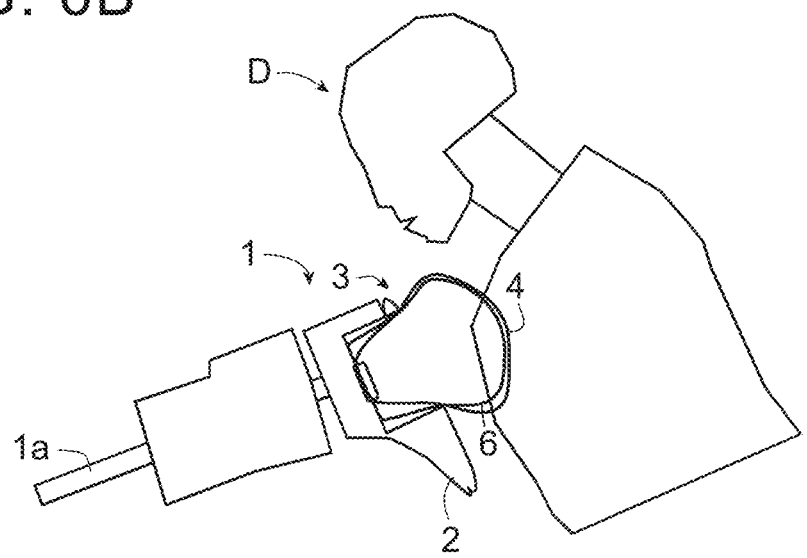
FIG. 6B is a schematic lateral view showing a state where the small airbag has inflated after the start of deployment of the airbag from the state of FIG. 6A.
Figure 6C:
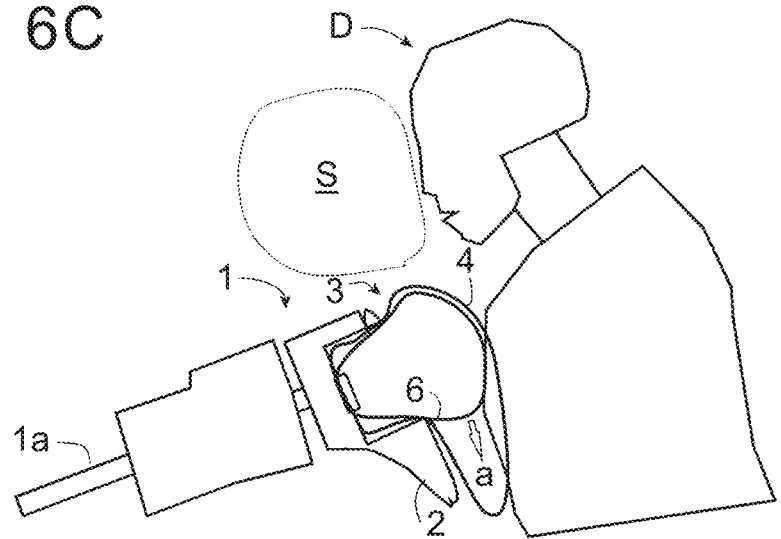
FIG. 6C is a schematic lateral view showing a state where a lower region (below and behind a module) of the airbag has started inflating from the state of FIG. 6B.

Thus, the airbag is deployed as follows. First of all, when an output G of the G sensor exceeds a predetermined value Go, a control command to generate gas is given to the inflator 5 from the ignition control device, and the inflator 5 starts delivering gas to the small airbag 6 in response thereto. Then, as shown in FIG. 6B, the part of the airbag 4 that is to abut on the driver's chest inflates together with the small airbag 6. Besides, the lower-rear gas flow outlet(s) 8 of the small airbag 6 may be opened, and the lower part of the airbag 4 may also start inflating. Then, even when the driver's trunk is close to the airbag module 3 due to inflation of these parts, the driver's chest or the driver's chest and abdomen are pushed backward, and at the same time, the driver's head retreats. Then, as shown in FIG. 6C, a space S above the airbag module 3 is more reliably vacated. In this state, when the upper part of the airbag 4 inflates, the airbag 4 can deploy in front of the driver's head. Therefore, a control command to open the upper gas flow outlet(s) 9 or the upper gas flow outlet(s) 9 and the rear gas flow outlets 10 is given to the tether cutter 7 from the ignition control device (FIG. 5). In this case, the predetermined time Δt from the issuance of the first control command to generate gas to the inflator 5 to the issuance of the control command to open the upper gas flow outlet(s) 9 or the upper gas flow outlet(s) 9 and the rear gas flow outlets 10 may be determined as an appropriate value through an experiment or the like. In concrete terms, the predetermined time Δt may be set to a time from the start of delivery of gas to the small airbag 6 to the inflation of the small airbag 6 backward with respect to the vehicle by a predetermined distance, namely, a distance by which the driver's chest is displaced to such an extent that the driver's head is released from the space above the airbag module 3 when the driver's trunk is close to the airbag module 3.

Figure 7A:
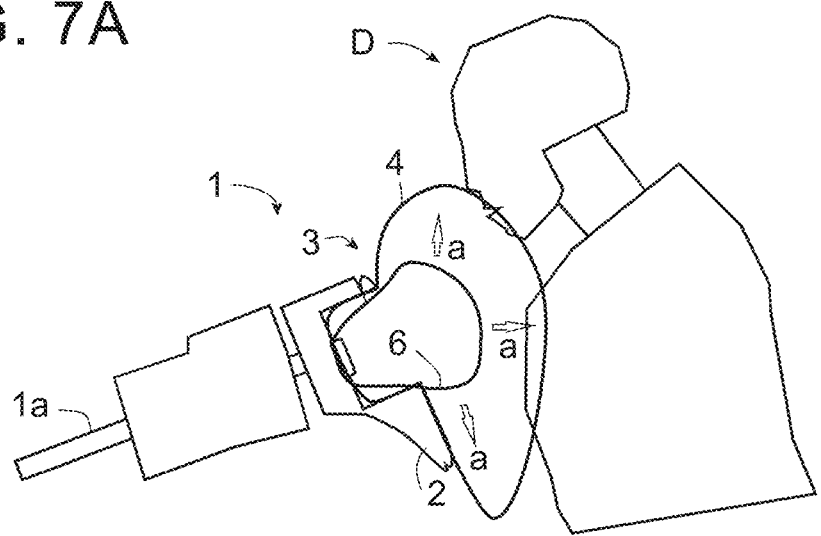
FIG. 7A is a schematic lateral view showing a state where a rear part and an upper part of the airbag have started inflating from the state of FIG. 6C.
Figure 7B:
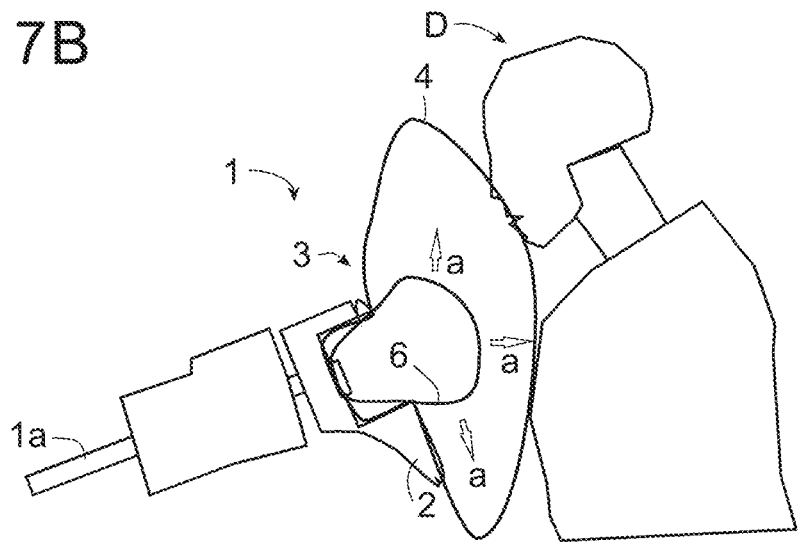
FIG. 7B is a schematic lateral view showing a state where the entire airbag has deployed from the state of FIG. 7A.

Then, when gas is caused to flow out from the upper gas flow outlet(s) 9 or the upper gas flow outlet(s) 9 and the rear gas flow outlets 10 of the small airbag 6 to the upper and rear parts of the airbag 4, these parts inflate without entering the space below the driver's chin. Thus, as depicted in FIGS. 7A and 7B, the airbag 4 is more reliably deployed entirely over the upper part of the driver's trunk including the front surface of the driver's head.

Thus, according to the present embodiment, even when the driver's trunk is inclined forward at the time of the start of deployment of the airbag and the driver's head exists in the space above the module in deploying the airbag, the entire airbag does not uniformly inflate, but the part of the airbag that is to abut on the driver's chest inflates first to displace the driver's chest from the module backward with respect to the vehicle. Thus, the driver's trunk is retreated, the space above the module is opened, and the airbag thereafter inflates into the space above the module. Therefore, the airbag can more reliably deploy into the space above the module. Besides, as described above, the part of the airbag that is to abut on the driver's chest first inflates, so a space is ensured between the steering wheel and the driver's trunk, and the airbag first inflates in the space. Thus, the internal pressure of the airbag becomes lower than in the case where there is no space between the steering wheel and the driver's trunk, and accordingly, the inflation pressure at the time when the airbag deploys upward is held relatively low. Therefore, there is also an advantage in that the impact on the driver is softened.

The foregoing description has been given in conjunction with the embodiments of the disclosure, but those skilled in the art can easily make many corrections and alterations. It would be obvious that the disclosure is not limited only to the embodiments exemplified above, and that the disclosure is applied to various devices without departing from the concept thereof.

What is claimed is:

1. An airbag device for a driver's seat of a vehicle, the airbag device comprising:
   an airbag module that is installed in a central region of a steering wheel of the vehicle, and that accommodates a primary airbag that is able to deploy by inflating behind the steering wheel, wherein
   the airbag module has an airbag inflation control unit that controls an inflation direction of the primary airbag in such a manner as to allow the primary airbag to inflate above the airbag module, after the primary airbag is configured to inflate in such a direction as to abut on a driver's chest at a time of deployment of the primary airbag, wherein
   a small airbag that inflates in a part thereof that is to be configured to abut on the driver's chest is provided inside the primary airbag, and
   the primary airbag is configured to be allowed to inflate above the airbag module after inflation of the small airbag, at the time of deployment of the primary airbag,
   the small airbag has an upper gas flow outlet that causes gas received from a gas outflow unit to flow out into an upper part in the primary airbag that deploys into a space above the airbag module, and a lower-rear gas flow outlet that causes the gas received from the gas outflow unit to flow out into a space below and behind the airbag module in the primary airbag,
   a gas flow control unit has a gas flow outlet opening/closing unit that controls opening/closing of the upper gas flow outlet,
   the upper gas flow outlet is held closed by the gas flow outlet opening/closing unit, and
   the upper gas flow outlet is opened upon lapse of a predetermined time after start of deployment of the primary airbag, by the gas flow outlet opening/closing unit.

2. The airbag device according to claim 1, wherein
   the steering wheel is a variant steering wheel having, above the airbag module, a space that is configured to be entered by a driver's head.

3. The airbag device according to claim 1, wherein
   the airbag module has the gas outflow unit that causes gas for inflating the primary airbag to flow out into the primary airbag at the time of deployment of the primary airbag, and a gas flow control unit that controls flow of gas in such a manner as to allow gas to flow from the gas outflow unit into the primary airbag in an upward direction with respect to the airbag module in such a direction as to be configured to abut on the driver's chest after inflation of the primary airbag.

4. The airbag device according to claim 1, wherein
   the small airbag further has a rear gas flow outlet that causes the gas to flow out into a space in the primary airbag behind the airbag module,
   the gas flow outlet opening/closing unit controls opening/closing of the rear gas flow outlet,
   the rear gas flow outlet is held closed at the time of start of deployment of the primary airbag, by the gas flow outlet opening/closing unit, and
   the rear gas flow outlet is opened upon lapse of the predetermined time after start of deployment of the primary airbag, by the gas flow outlet opening/closing unit.

5. The airbag device according to claim 1, wherein
   the gas flow outlet opening/closing unit has a tether that keeps the gas from flowing by contracting a corresponding one of the gas flow outlets when being wound, pulled, and tensed in a vicinity of that one of the gas flow outlets through which the gas is kept from flowing at the time of start of deployment of the primary airbag, and a tether cutter that cuts the tether,
   the tether cutter cuts the tether upon lapse of the predetermined time after start of deployment of the primary airbag, and
   the corresponding one of the gas flow outlets is configured to be opened when the tether is cut and loosened.

6. The airbag device according to claim 1, wherein
   the primary airbag inflates in such a direction as to be configured to abut on the driver's chest after start of deployment of the primary airbag, and
   the primary airbag starts inflating above the airbag module upon lapse of a predetermined time.

7. The airbag device according to claim 1, wherein
   the primary airbag starts inflating above the airbag module after having inflated by a predetermined distance in such a direction as to be configured to abut on the driver's chest, from the steering wheel backward with respect to the vehicle, after start of deployment of the primary airbag.

* * * * *